United States Patent
Gutmann et al.

(10) Patent No.: US 7,703,800 B2
(45) Date of Patent: Apr. 27, 2010

(54) AIRBAG ARRANGEMENT FOR A MOTOR VEHICLE SEAT

(75) Inventors: Ralf Gutmann, Ulm (DE); Reiner Söll, Berghülen (DE); Rainer Heuschmid, Ulm (DE); Robert Getz, Ulm (DE); Matthias Polte, Zusmarshausen (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/292,405

(22) Filed: Nov. 18, 2008

(65) Prior Publication Data

US 2009/0146399 A1 Jun. 11, 2009

Related U.S. Application Data

(63) Continuation of application No. PCT/EP2007/053960, filed on Apr. 23, 2007.

(30) Foreign Application Priority Data

May 19, 2006 (DE) .................. 20 2006 008 373 U

(51) Int. Cl.
*B60R 21/20* (2006.01)
(52) U.S. Cl. .................. 280/730.2; 280/728.2
(58) Field of Classification Search .............. 280/728.2, 280/730.2, 730.1
See application file for complete search history.

(56) References Cited

U.S. PATENT DOCUMENTS

| | | | |
|---|---|---|---|
| 2,755,125 A | 7/1956 | Hodges | |
| 5,498,030 A | 3/1996 | Hill et al. | |
| 5,636,862 A | 6/1997 | Cheung et al. | |
| 5,803,485 A | 9/1998 | Acker et al. | |
| 5,890,734 A | 4/1999 | Saderholm | |
| 5,967,603 A * | 10/1999 | Genders et al. | 297/216.13 |
| 6,019,387 A * | 2/2000 | Jost | 280/730.2 |
| 6,074,003 A | 6/2000 | Umezawa et al. | |
| 6,293,580 B1 | 9/2001 | Lachat et al. | |
| 6,302,431 B1 * | 10/2001 | Sasaki et al. | 280/728.2 |
| 6,341,797 B1 * | 1/2002 | Seo | 280/730.2 |
| 6,357,789 B1 * | 3/2002 | Harada et al. | 280/730.2 |
| 6,364,347 B1 | 4/2002 | Holdampf et al. | |
| 6,364,348 B1 * | 4/2002 | Jang et al. | 280/730.2 |

(Continued)

FOREIGN PATENT DOCUMENTS

DE 21 16 347 B2 10/1972

(Continued)

*Primary Examiner*—Paul N Dickson
*Assistant Examiner*—Nicole Verley
(74) *Attorney, Agent, or Firm*—Foley & Lardner LLP

(57) ABSTRACT

An apparatus for an airbag arrangement including a frame part and an airbag package. The frame part may be a part of a base body of a motor vehicle seat. The airbag package is fastened to the frame part. The airbag package includes a folded-up airbag that may be inflated with gas. The airbag package further includes at least one clamping element that is configured to press the airbag package against the frame part. The clamping element includes a first and a second end region via which the clamping element is secured to the frame part. The two end regions are connected to one another via a pretensionable bearing region of the clamping element. The clamping element includes an intermediate layer extending between the airbag package and the frame part, that together with the bearing region encompasses the airbag package in cross section by 360°.

33 Claims, 8 Drawing Sheets

U.S. PATENT DOCUMENTS

| | | | |
|---|---|---|---|
| 6,439,597 B1 * | 8/2002 | Harada et al. | 280/728.2 |
| 6,543,803 B1 * | 4/2003 | Harada et al. | 280/730.2 |
| 6,578,866 B2 * | 6/2003 | Higashi | 280/728.2 |
| 6,578,911 B2 * | 6/2003 | Harada et al. | 297/216.13 |
| 6,889,999 B2 * | 5/2005 | Dominissini et al. | 280/730.2 |
| 7,306,257 B2 * | 12/2007 | Yoshikawa et al. | 280/728.2 |
| 7,384,062 B2 * | 6/2008 | Yokoyama et al. | 280/730.2 |
| 2001/0019202 A1 * | 9/2001 | Holdampf et al. | 280/730.2 |
| 2004/0140653 A1 | 7/2004 | Bossecker et al. | |
| 2006/0131848 A1 * | 6/2006 | Miyake et al. | 280/730.2 |
| 2007/0085308 A1 * | 4/2007 | Tracht et al. | 280/730.2 |

FOREIGN PATENT DOCUMENTS

| | | |
|---|---|---|
| DE | 75 40 488 | 4/1976 |
| DE | 198 48 905 A1 | 5/1999 |
| DE | 199 25 759 A1 | 1/2000 |
| DE | 102 33 595 A1 | 2/2004 |
| DE | 102 37 697 A1 | 2/2004 |
| DE | 20 2004 000 871 U1 | 5/2004 |
| DE | 20 2004 009 001 U1 | 9/2004 |
| DE | 103 07 480 A1 | 9/2004 |
| DE | 203 20 659 U1 | 6/2005 |
| DE | 10 2004 042 039 A1 | 3/2006 |
| DE | 10 2004 042 114 A1 | 3/2006 |
| EP | 1 069 005 A2 | 1/2001 |
| EP | 1 053 134 B1 | 4/2003 |
| EP | 1 132 261 B1 | 11/2003 |
| EP | 1 314 618 B1 | 8/2006 |
| JP | 9-123864 A | 5/1997 |

\* cited by examiner

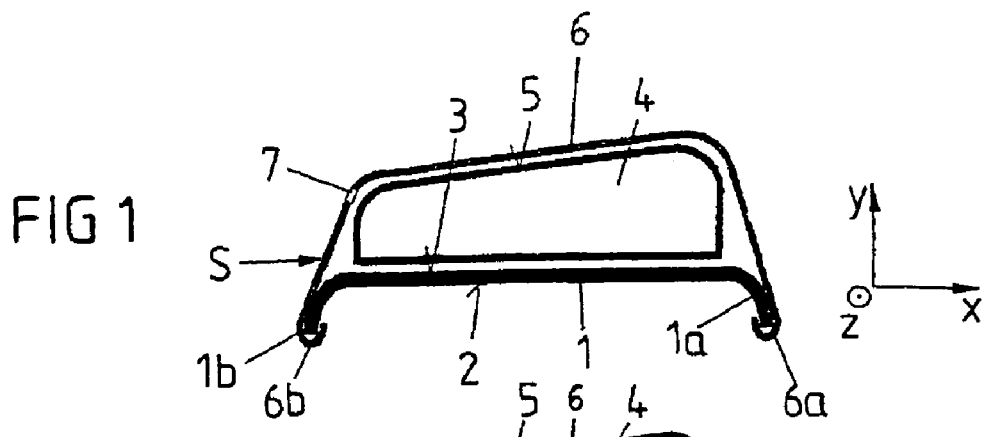
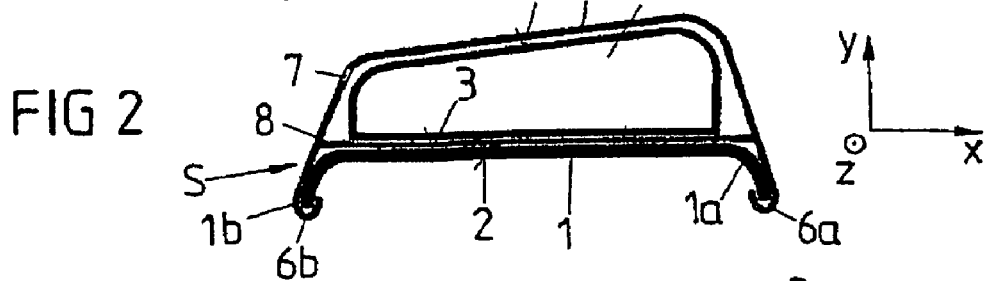
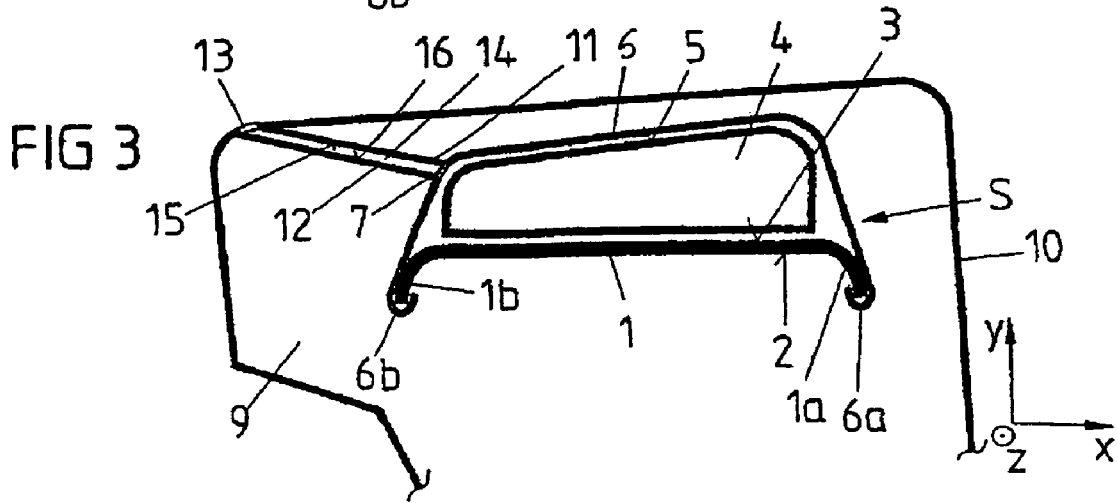
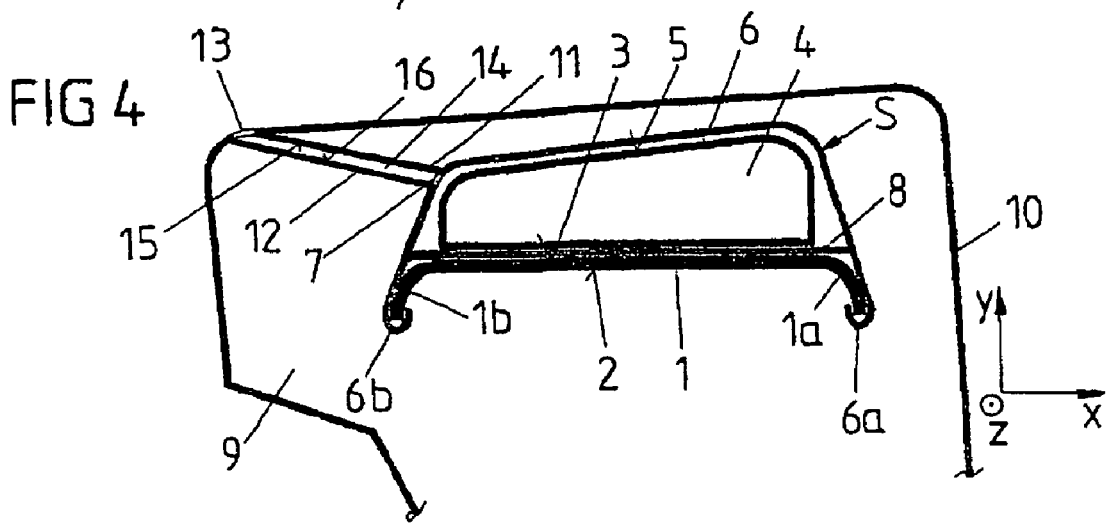

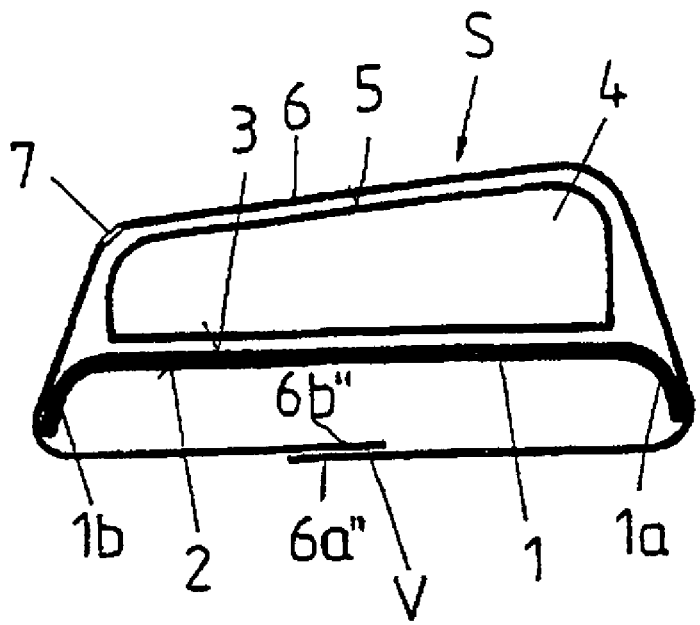
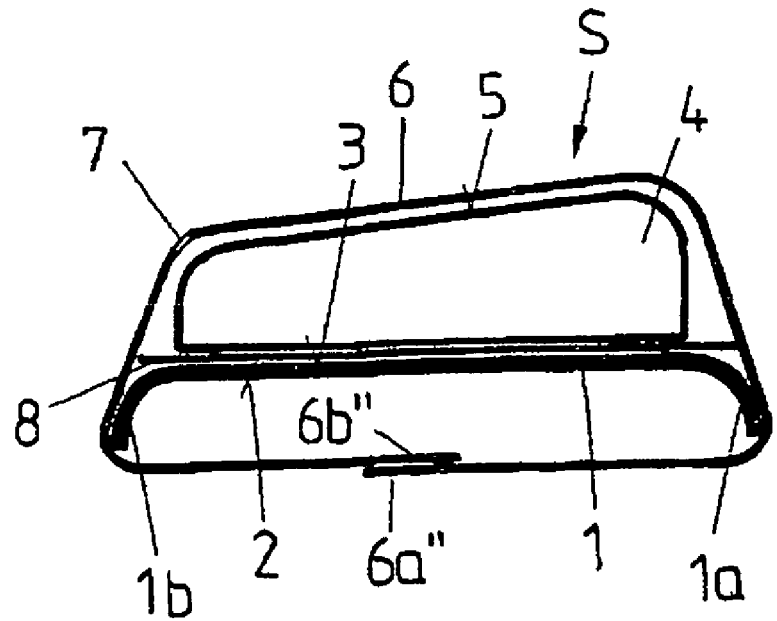

AIRBAG ARRANGEMENT FOR A MOTOR VEHICLE SEAT

CROSS-REFERENCE TO RELATED PATENT APPLICATIONS

This application is a Continuation of International Application PCT/EP2007/053960, filed Apr. 23, 2007, which was published in German as WO 2007/134931 and is incorporated herein by reference in its entirety.

BACKGROUND

The present invention relates generally to the field of an airbag arrangement for a motor vehicle.

SUMMARY

One disclosed embodiment relates to an apparatus for an airbag arrangement for a motor vehicle including a frame part and an airbag package. The frame part can be a part of a base body of a motor vehicle seat. The airbag package is fastened to the frame part. The airbag package includes at least one folded-up airbag that may be inflated with gas to protect an individual. The airbag package further includes at least one clamping element that is configured to press the airbag package against the frame part. The clamping element includes a first and a second end region via which the clamping element is secured to the frame part. The two end regions are connected to one another via a pretensionable bearing region of the clamping element that is pretensioned against the airbag package such that it presses the airbag package against the frame part and the clamping element. The clamping element includes an intermediate layer extending between the airbag package and the frame part, that together with the bearing region of the clamping element encompasses the airbag package in cross section by 360°.

BRIEF DESCRIPTION OF THE DRAWINGS

The features and advantages of the invention shown are intended to be clarified with reference to the following description of embodiments in the figures.

FIG. 1 is a sectional view of an airbag arrangement, according to an exemplary embodiment;

FIG. 2 is a sectional view of a modification of the airbag arrangement of FIG. 1, according to an exemplary embodiment;

FIG. 3 is a sectional view of the airbag arrangement of FIG. 1, according to a further exemplary embodiment;

FIG. 4 is a sectional view of a modification of the airbag arrangement of FIG. 3, according to an exemplary embodiment;

FIG. 9 is a sectional view of a modification of the airbag arrangement shown in FIG. 1, according to an exemplary embodiment;

FIG. 9A is a sectional view of a modification of the connection shown in FIG. 9, according to an exemplary embodiment;

FIG. 10 is a sectional view of a modification of the airbag arrangement shown in FIG. 9, according to an exemplary embodiment;

DETAILED DESCRIPTION

Figure 5:
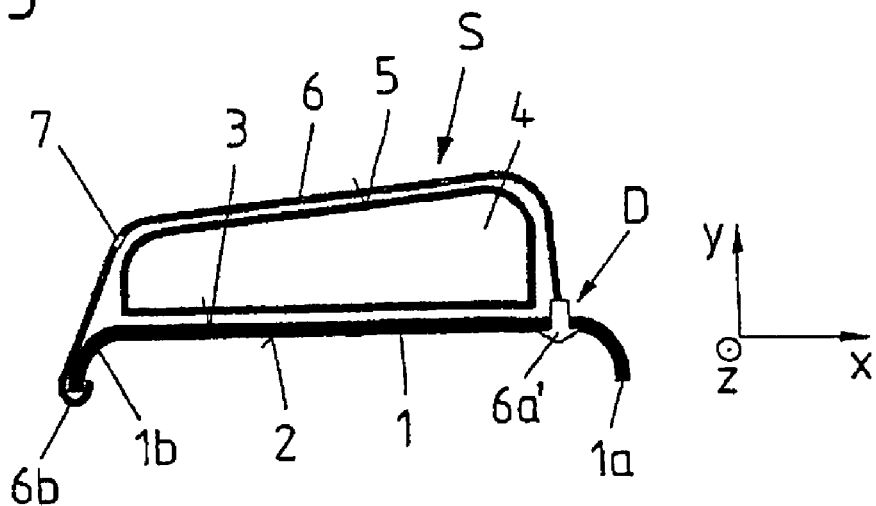
FIG. 5 is a sectional view of a modification of the airbag arrangement shown in FIG. 1, according to an exemplary embodiment.

An airbag arrangement includes a frame part and an airbag package. The frame part is a part of a base body of a motor vehicle seat. The airbag package is fastened to the frame part and includes at least one folded-up airbag. The folded-up airbag may be inflated with gas to protect an individual.

The frame part can include a portion of a backrest frame of a backrest of a motor vehicle seat, extending along the vehicle vertical axis. In this case, the airbag is designed to be deployed when a vehicle occupant occupying the motor vehicle seat is at risk of injury from the lateral bodywork of the motor vehicle.

In airbag arrangements of the aforementioned type, the constructional space available for the airbag package is limited. Therefore, it is desirable to provide an airbag arrangement of the aforementioned type wherein the airbag package takes up as little constructional space as possible.

According to an exemplary embodiment, an airbag package includes at least one additional clamping element. The clamping element is designed to press the airbag package against the frame part. As a result, the airbag package is compressed by the clamping element. Thus, the constructional space required for the airbag package is reduced.

Further, the airbag package is fixed to the frame part such that the individual folds of the folded-up airbag of the airbag package may not slip relative to one another. As a result, the reproducibility of the deployment process during inflation of the airbag is improved.

According to an exemplary embodiment, the clamping element is configured to be at least partially flexible. For example, the clamping element can be constructed of a woven fabric, knitted fabric or a film-like material. As a result, the clamping element can cling to the airbag package such that the clamping element takes up a small portion of the overall available constructional space. Alternatively, the clamping element can be configured to be rigid, in particular rod-shaped or clip-shaped.

According to an exemplary embodiment, the clamping element encompasses the airbag package in cross section by at least 180°. Thus, the airbag package may be fixed securely via the clamping element to the frame part. In a further embodiment, the clamping element encompasses the airbag package and the frame part in cross section by at least 360°.

According to an exemplary embodiment, the airbag package includes a first outer face remote from the frame part that is preferably completely covered by the clamping element. As a result, the airbag package may be pressed advantageously over a large surface area against the frame part and/or clamped thereto.

According to an exemplary embodiment, the clamping element includes a first and a second end region via which the clamping element is secured to the frame part by pretensioning. Thus, the airbag package is pressed against the frame part. Further, the two end regions are preferably connected to each another via a bearing region of the clamping element.

According to an exemplary embodiment, the frame part extends longitudinally in a direction of extension. The frame part can include a first and a second edge region extending in the direction of extension. Further, the first and second edge region oppose one another transversely to the direction of extension. Additionally, the first and/or the second edge region can project from an inner face of the frame part remote from the airbag package. For example, the first and/or the second edge regions can be bent away from the airbag package.

According to an exemplary embodiment, the first and/or the second end region are non-positively connected to the frame part for securing the clamping element. Additionally or alternatively, the first and/or second end region can be positively connected to the frame part. Further, the above connections can be configured to be releasable without causing damage. Thus, assembly costs and maintenance costs are reduced. Additionally, the clamping element is fastened by pretensioning to the frame part via the end regions. As a result, the clamping element bears tightly against the airbag package and presses the airbag package against the frame part.

According to an exemplary embodiment, at least one of the end regions is designed to encompass one of the two edge regions of the frame part, thereby securing the clamping element to the frame part. Additionally, the at least one end region is configured as an elongated strip of hook-shaped cross section. The elongated strip encompasses the one edge region, that extends in the direction of extension along the entire airbag package. As a result, the airbag package can be clamped securely to the frame part over the frame parts entire length in the direction of extension. Further, a uniform compression of the airbag package is ensured in the direction of extension. In a further exemplary embodiment, at least one of the end regions of the clamping element is formed by strip portions of hook-shaped cross section. Further, the end regions of the clamping element are spaced apart from one another in the direction of extension for encompassing an edge region of the frame part. As a result, portions of the one edge region are exposed in the direction of extension. Additionally, further components may be secured to the edge region. For example, a cover of a backrest of the motor vehicle seat can be secured to the edge region.

According to an exemplary embodiment, one of the two end regions of the clamping element is be configured as a clip element for securing the clamping element to the frame element. The end region is configured to engage behind a through-opening of the frame part. The through-opening is configured on one of the edge regions of the frame part. For securing to the frame part, the clamping element can initially be secured via the clip element to the first edge region of the frame part in a through-opening. Then, the clamping element can be suspended on the opposing second edge region of the frame part by pretensioning.

According to an exemplary embodiment, the first and the second end regions are non-positively and/or positively connected to one another for securing the clamping element to the frame part. The clamping element encompasses the airbag package as well as the frame part by at least 360° in cross section by pretensioning. Thus, the clamping element presses the airbag package against the frame part. The tensile forces, that act on the end regions of the clamping element to, oppose one another. Therefore, the end regions can be of hook-shaped configuration such that they may engage in one another for forming a connection between the two end regions.

According to an exemplary embodiment, the first and the second end regions are of planar configuration and are connected to one another via a connection of planar configuration. For example, the first and second end regions can be connected to each other via a Velcro connection. Thus, at one of the two end regions a hook region of a Velcro connection can be provided that can engage in an eye region of the Velcro connection provided at the other end region. Further, the two end regions can also be bonded or welded to one another.

According to an exemplary embodiment, the frame part is formed by a portion of a backrest frame of a backrest of the motor vehicle, extending substantially along the vehicle vertical axis. Generally, a backrest of a motor vehicle seat can be pivoted about an axis extending parallel to the vehicle transverse axis. Thus, the orientation of the backrest frame is also altered relative to the vehicle vertical axis.

The bearing region of the clamping element includes a first openable region, that is configured to open when the airbag presses against the region during inflation. Thus, the airbag may be deployed during inflation through the clamping element in the interior of the motor vehicle. The openable region may be a weak point of the material of the clamping element that may be configured, for example, in a linear manner. Additionally, the openable region may be formed by a perforation or a tear seam. In an airbag package secured to a backrest frame, the first openable region may face the motor vehicle front. Thus, the airbag may be deployed along the vehicle longitudinal axis between a vehicle occupant occupying the motor vehicle seat and the lateral vehicle bodywork.

According to an exemplary embodiment, the clamping element includes an intermediate layer extending between the airbag package and the frame part. The intermediate layer, together with the bearing region of the clamping element, encompasses the airbag package in cross section by 360°. As a result, the intermediate layer forms with the bearing region a pocket for receiving the airbag packet. Thus, during assembly to the frame part, the airbag package does not have to be handled separately. Further, the intermediate layer can be of flexible configuration. For example, the intermediate layer can be made from a woven fabric, knitted fabric or a film-like material.

According to an exemplary embodiment, the airbag arrangement includes a cushion that at least partially surrounds the frame part and the airbag package in cross section. The cushion includes a gap extending along the airbag package, with a first and a second side extending along the airbag package. The first and second side oppose one another. Along the first and side, the airbag may be deployed through the gap into the interior of the motor vehicle during inflation. The cushion may be of flexible configuration such that the gap can be enlarged during inflation of the airbag. The cushion can be surrounded by a cover that bears against an outer face of the cushion remote from the airbag package and the frame part. The cover may be a textile sheet material or a film-like material. Further, the cover may be made from leather or a similar material.

According to an exemplary embodiment, a flexible first element is included. The flexible first element branches off from the bearing region of the clamping element. The first element covers the first side of the gap for shielding the cushion from the deployed airbag. Further, a flexible second element is provided. The flexible second element branches off from the bearing region. The second element covers the second side of the gap for shielding the cushion from the deployed airbag.

The cover includes a second openable region that is configured to open when the airbag presses against the second openable region during inflation. Thus, the airbag can be deployed through the open second region during inflation. The region may, in a similar manner to the first openable region, face the front of the motor vehicle.

The first and the second elements are connected to the cover on the second openable region of the cover. As a result, the airbag, when deployed during inflation, is guided into the gap along the first and the second flexible element against the second openable region of the cover (deployment channel).

According to an exemplary embodiment, the cushion encloses the frame part in cross section. The cushion includes a third openable region that is configured to open when the airbag presses against the third openable region during inflation.

Additionally, a gas generator is provided that releases gases required for inflating the airbag. Further, the airbag package includes a flexible sleeve surrounding the airbag that also may surround the gas generator.

According to an exemplary embodiment, the sleeve is integrally connected to the airbag. The sleeve includes a fourth openable region that is configured to open when the airbag presses against the fourth openable region during inflation. Thus, the airbag may be deployed through the open fourth region during inflation.

According to an exemplary embodiment, a backrest of a motor vehicle seat including a frame part can be included. Further, an airbag can be arranged on the backrest of the motor vehicle seat according to the airbag arrangement of the disclosure.

FIG. 1 shows, in combination with FIG. 3, a schematic plan view of a frame part 1, according to an exemplary embodiment. The frame part 1 is in the form of a portion of a backrest frame L of a motor vehicle seat that extends substantially along the vehicle vertical axis z. An inner face 2 faces the interior of the motor vehicle along the vehicle transverse axis y. The inner face 2 also faces an outer face 3 of the frame part 1 remote from the inner face 2. Due to the pivotability of the backrest frame L and/or the backrest of a motor vehicle seat, the frame part 1 can extend in a direction of extension including both a component along the vehicle transverse axis x and along the vehicle vertical axis z. Further, the frame part 1 is intended to extend longitudinally along the vehicle vertical axis z.

Figure 14:
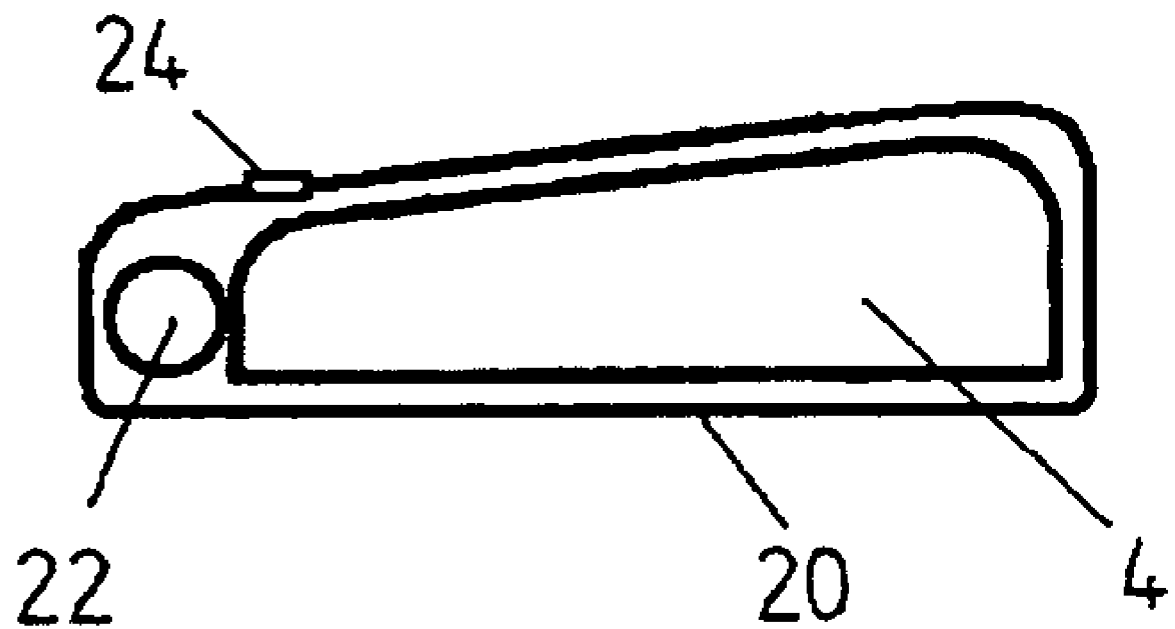
FIG. 14 is a schematic view of an airbag package with an outer flexible sleeve and a gas generator.

Airbag package 4 is configured to extend longitudinally along the vehicle vertical axis z. The airbag package 4 is fastened to the outer face 3 of the frame part 1 that includes at least one folded-up airbag that may be inflated with gas. During inflation, the airbag is deployed along a plane that is spanned by a vehicle axis extending parallel to the vehicle longitudinal axis x and a vehicle axis extending parallel to the vehicle vertical axis z. The airbag package 4 can include an outer flexible sleeve 20 for protecting the airbag (and further components), as seen in FIG. 14. The airbag is arranged in a folded state in the outer flexible sleeve before inflation. Furthermore, the sleeve can surround a gas generator 22 serving to inflate the airbag and can be integrally connected to the airbag.

An airbag for side protection can include a plurality of chambers. For example, the airbag can include a neck chamber and a head chamber for protecting the chest region and/or the head of an individual occupying the motor vehicle seat. A gas flow distributor may be included for distributing a gas flow into the individual chambers or regions of the airbag. The gas flow distributor may consist of a flexible material (e.g., a woven material). For example, in a cylindrical gas generator, the gas flow distributor can be configured as a cylindrical sleeve that is axially pushed onto the gas generator. Thus, the gas flow distributor can cover gas outlets of the gas generator that are on the outer casing of the gas generator. As a result, the gas flow is divided. The gas may flow in two opposing directions oriented parallel to the cylinder axis of the gas generator. As a result, gas may be supplied, for example, to a head chamber or a neck chamber of the airbag.

When the airbag of the airbag package 4 is surrounded by an outer sleeve 20, an openable region denoted as the fourth openable region 24 is included on the sleeve 20, as seen in FIG. 14. The fourth openable region is configured to open when the airbag presses against it during inflation. Thus, the airbag may be deployed during inflation along the vehicle longitudinal axis x through the open fourth openable region into the interior of the motor vehicle. The openable region may be a tear seam or a perforation of the outer sleeve of the airbag package 4.

Additionally, a clamping element S is included with a bearing region 6, thereby making the airbag package 4 more compact. The bearing region 6 bears against an outer face 5 of the airbag package 4 remote from the outer face 3 of the frame part 1 and covers the outer face in a planar manner. Thus, the bearing region 6 of the clamping element S presses the airbag package 4 along the vehicle transverse axis y against the frame part 1 and namely against the outer face 3 thereof. The bearing region 6 is secured to the frame part 1 along the vehicle longitudinal axis x on both sides of the airbag package 4 via a first and a second end region 6a, 6b of the clamping element S. The first and second end region 6a, 6b are connected to one another via the bearing region 6, and thereby pretensioned against the airbag package 4. Thus, the pretensioned bearing region 6 encompasses the airbag package 4 in cross section by at least 180° and presses the airbag package against the outer face 3 of the frame part 1.

Further, the frame part 1 includes a first and a second edge region 1a, 1b extending along the vehicle vertical axis z. The first and second edge region 1a, 1b are spaced apart from one another and oppose one another along the vehicle longitudinal axis x. Additionally, the first and the second edge region 1a, 1b are bent toward the interior of the motor vehicle, such that they project along the vehicle transverse axis y from the inner face 2 of the frame part 1. The two end regions 6a, 6b of the clamping element S are of hook-shaped configuration in cross section, such that they may encompass the first and/or the second edge region 1a, 1b. Thus, the respective hook opening along the vehicle transverse axis y faces the inner face 2 of the frame part 1. As a result, the first and the second edge regions 1a, 1b absorb the tensile forces that the pretensioned bearing region 6 exerts on the two edge regions 1a, 1b of the frame part 1. Further, the bearing region 6 presses the airbag, package 4 against the outer face 3 of the frame part 1 with a force oriented along the vehicle transverse axis y.

An openable region (e.g., a tear seam or a perforation) denoted as a first openable region 7 is included on the bearing region 6. The first openable region 7 extends along the vehicle vertical axis z and faces the front of the motor vehicle along the vehicle longitudinal axis x such that the airbag may expand along the vehicle longitudinal axis x during deployment. The openable region opens when the airbag presses against the first openable region 7 during inflation. Thus, the airbag can penetrate the clamping element S during inflation.

Shown in FIG. 3, the backrest frame L together with the frame part 1 is surrounded in cross section by a cushion 9. The cushion 9 is covered by an (outer) cover 10. The cushion 9 includes a gap 14 arranged such that the airbag may penetrate the cushion 9 during inflation. The gap 14 extends along the vehicle vertical axis z. The vertical axis Z is formed by a first side 15 and a second side 16 of the cushion 9. The first side 15 and the second side 16 extend respectively along the vehicle vertical axis z and oppose one another. Furthermore, an openable region of the cover 10 is included at a region of the cover 10 covering the gap 14 toward the interior of the motor vehicle. The openable region of the cover 10 is denoted as the second openable region 13. During deployment, the airbag can expand through the second openable region 13 and into the gap 14, thereby entering the interior of the motor vehicle. The second openable region 13 also extends along the vehicle vertical axis z over the entire length of the airbag package 4 and faces the front of the motor vehicle along the vehicle longitudinal axis x. Further, the second openable region 13 can be a tear seam or a perforation (weak point) of the cover 10.

The first side 15 and second 16 can be covered by a first and/or a second flexible element 11, 12. As a result, the cushion 9 in addition to the first side 15 and second side 16 can be shielded during deployment of the airbag.

Further, the first and the second element 11, 12 form a deployment channel that connects the first openable region 7 to the second openable region 13. As a result, the airbag is deployed during inflation along the first and the second flexible element 11, 12. The two elements 11, 12 prevent the airbag from dragging along material of the cushion 9 (for example by abrasion).

FIG. 2 shows, in combination with FIG. 4, a modification of the airbag arrangement shown in FIGS. 1 and 3, according to an exemplary embodiment. In contrast to FIGS. 1 and 3, an intermediate layer 8 of the clamping element S is included. The intermediate layer 8 is arranged along the vehicle transverse axis y between the frame part 1 and the airbag package 4. Thus, the bearing region 6, together with the intermediate layer 8, forms a pocket for receiving the airbag package 4. The pocket completely encloses the airbag package 4 in cross section. As a result, the airbag package 4 does not have to be separately positioned and retained when mounting the airbag package 4 on the frame part 1.

Figure 6:
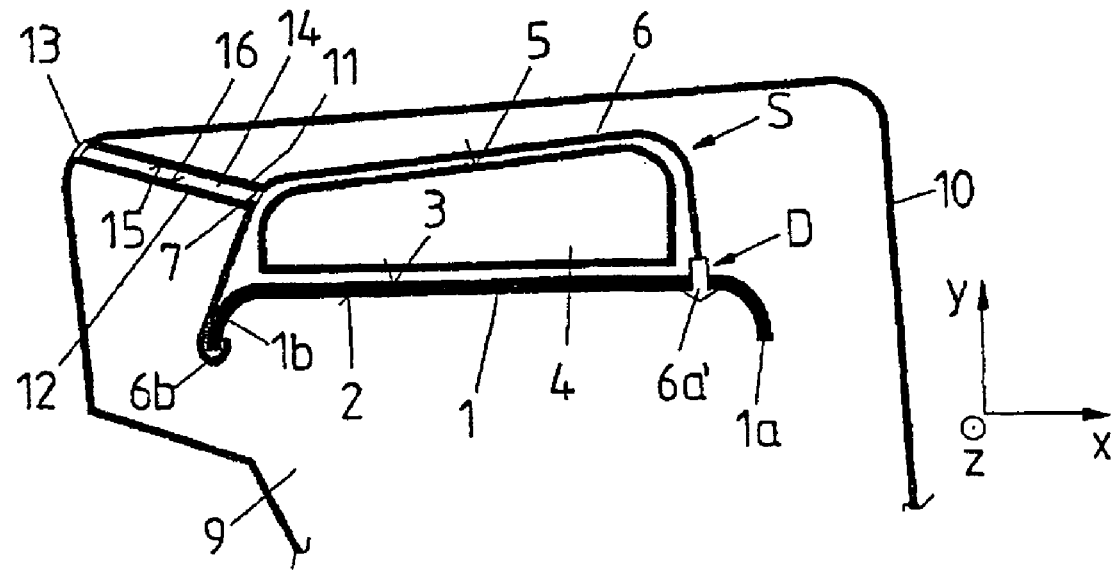
FIG. 6 is a sectional view of a modification of the airbag arrangement shown in FIG. 3, according to an exemplary embodiment.

FIG. 5 shows, in combination with FIG. 6, a modification of the type shown in FIGS. 1 and 3, according to an exemplary embodiment. In contrast to FIGS. 1 and 3, the two end regions 6a, 6b of the clamping element S are configured differently. In the embodiment according to FIGS. 1 and 3, both end regions 6a, 6b of the clamping element S are of hook-shaped configuration in cross section. In the embodiment according to FIGS. 5 and 6, one of the two end regions of the clamping element S are designed as a clip element 6a'.

The clip element 6a' includes a correspondingly long bearing region 6. Thus, the clip element 6a' can be configured as a clip strip extending along the vehicle vertical axis z along the entire airbag package 4. Additionally, a plurality of clip elements 6a' can be included that are configured to be distributed along the vehicle vertical axis z on the bearing region 6.

Additionally, one of the two ends of the bearing region 6 can be formed as a clip element 6a'. As a result, the airbag package 4 can be fastened to the frame part 1 when mounting the airbag package 4 on the backrest frame L. For example, the airbag package 4 can be mounted via pins projecting from the airbag package. The pins are guided through through-openings of the frame part 1 and are secured from the inner face 2 to the frame part 1. Subsequently, the airbag package 4 is clamped by the clamping element S to the frame part 1. The clip element 6a' (or a plurality of clip elements) is secured to the first edge region 1a. More particularly, the clip element 6a' is inserted along the vehicle transverse axis y into a through-opening D configured on the first edge region 1a such that the clip element 6a' engages behind the through-opening D with a widened head of the clip element 6a'. Thus, the clamping element S is fixedly connected on one side to the frame part 1. Additionally, the clamping element S may subsequently be hooked onto the second edge region 1b by pretensioning on the second edge region 1b via the second end region 6b of hook-shaped configuration in cross section. The second end region 6b encompasses the second edge region 1b of the frame part 1 according to FIG. 1.

Figure 8:
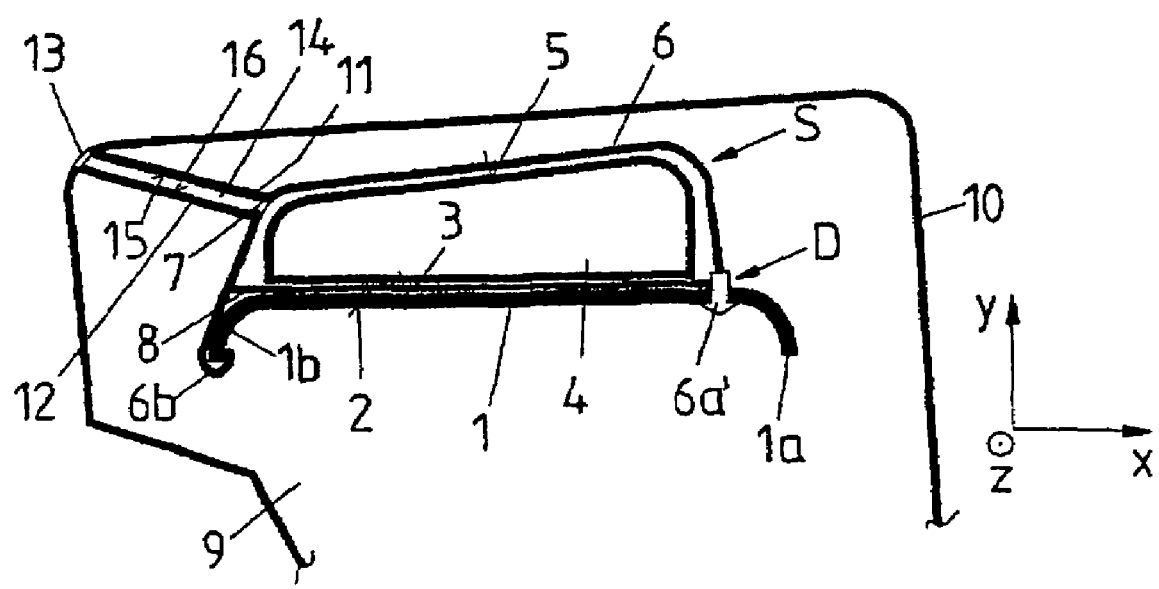
FIG. 8 is a sectional view of a modification of the airbag arrangement shown in FIG. 6, according to an exemplary embodiment.
Figure 11:
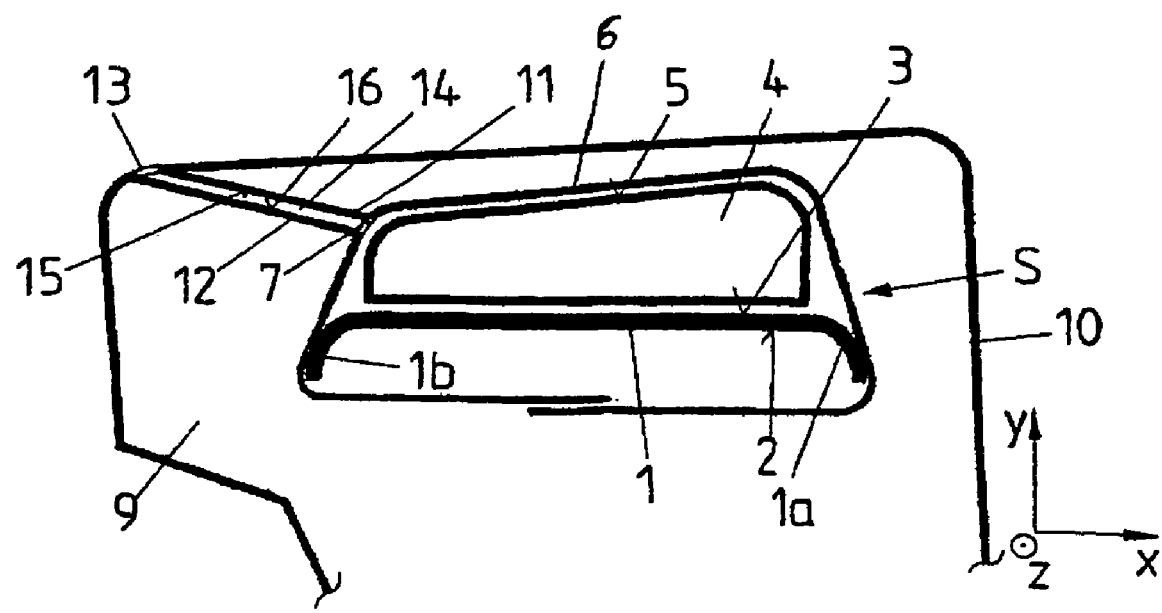
FIG. 11 is a sectional view of a modification of the airbag arrangement shown in FIG. 3, according to an exemplary embodiment.

FIG. 8 shows a modification of the airbag arrangement shown in FIGS. 5 and 6, according to an exemplary embodiment. In contrast to FIGS. 5 and 6, an additional intermediate layer 8 is provided according to FIG. 4. The intermediate layer 8 is arranged along the vehicle transverse axis y between the frame part 1 and the airbag package 4. Further, the intermediate layer 8 is connected to the bearing region 6 such that the bearing region 6 forms together with the intermediate layer 8 a pocket for receiving the airbag package 4. The pocket formed by intermediate layer 8 and bearing region 6 completely surrounds the airbag package 4 in cross section.

Figure 7:
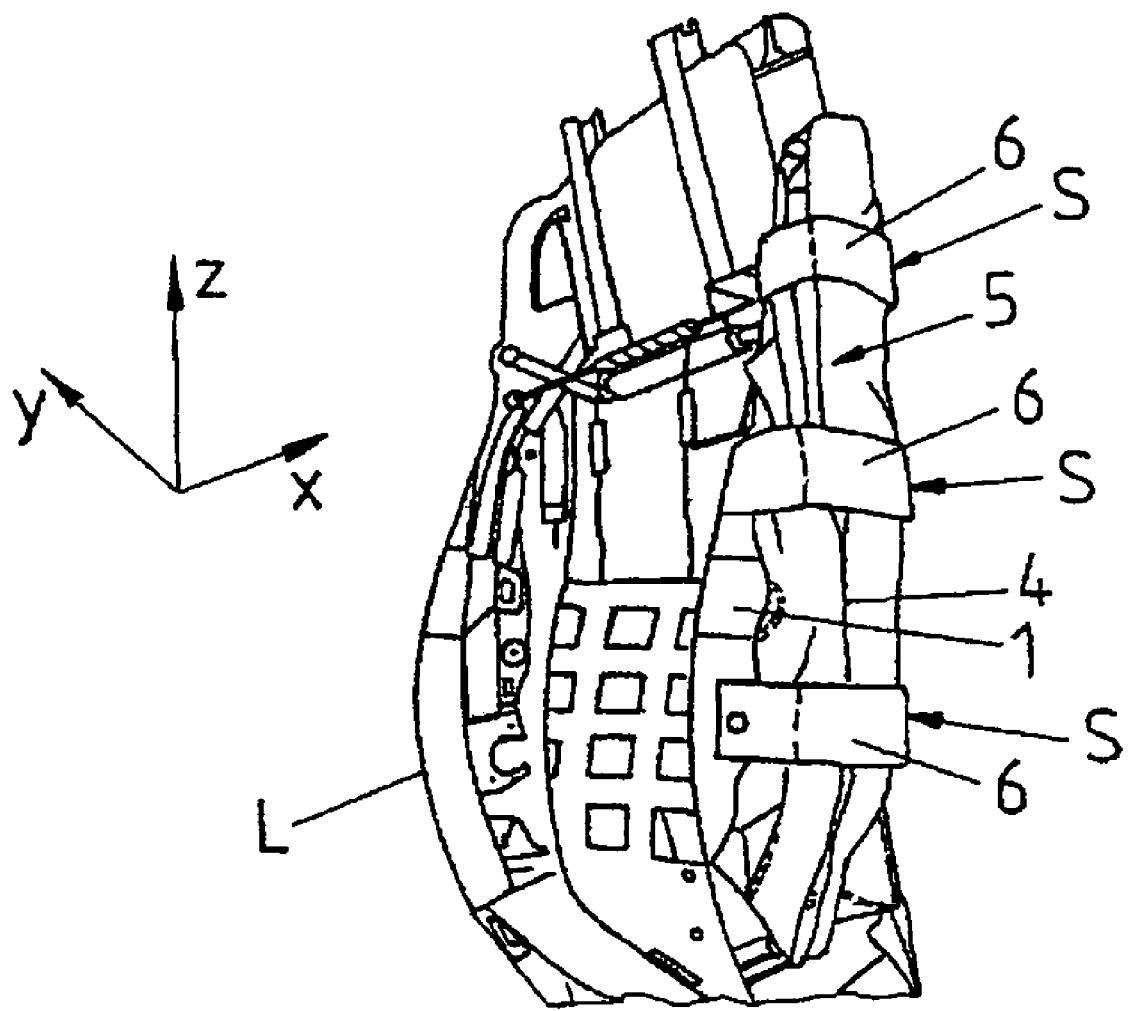
FIG. 7 is a perspective view of a backrest frame for a motor vehicle seat, according to an exemplary embodiment.

FIG. 7 shows a further embodiment of the airbag arrangement, according to an exemplary embodiment. Shown in FIG. 7, the clamping element S does not completely cover the outer face 5 of the airbag package 4. Instead, a plurality of clamping elements S are provided that are secured via their first and second end region 6a, 6b along the vehicle vertical axis z to the first and/or second edge region 1a, 1b of the frame part 1. In this case, both end regions 6a, 6b may be of hook-shaped configuration or one of the two end regions may be configured as a clip element 6a'.

FIG. 9 shows a sectional illustration of a modification of the arrangement shown in FIG. 1, according to an exemplary embodiment. In contrast to FIG. 1, the two end regions 6a" and 6b" of the clamping element S are not secured to the first and/or second edge region 1a, 1b of the clamping element S. The two end regions 6a" and 6b" are connected to one another such that the clamping element S surrounds the airbag package 4 together with the frame part 1 in cross section. The clamping element S is pretensioned against the airbag package 4 and presses the airbag package via the bearing region 6 of the clamping element S against the frame part 1. According to FIG. 9, the two end regions 6a", 6b" of the clamping element S are fastened to one another via a connection V of planar configuration. Due to the pretensioning of the clamping element S, tensile forces opposing one another act on the connection V. The connection V can be a bonded connection, a welded connection or a releasable connection without causing damage (for example a Velcro connection). Due to the tensile forces opposing one another, end regions 6a''', 6b''' of hook-shaped cross section are suitable for forming a connection between the two end regions 6a", 6b". More particularly, the hook-shaped end regions 6a''', 6b''' engage in one another and thus are able to absorb the opposing tensile forces.

FIG. 10 shows a variant of the airbag arrangement shown in FIG. 9, according to an exemplary embodiment. In contrast to FIG. 9, an intermediate layer 8 is arranged along the vehicle transverse axis y between the airbag package 4 and the frame part 1.

The variants disclosed above in FIGS. 9 and 9A, for connecting the first end region 6a", 6a''', to the second end region 6b", 6b''' of the clamping element S may naturally also be used in the other embodiments according to FIGS. 3 and 4 (see FIG. 1).

Figure 12:
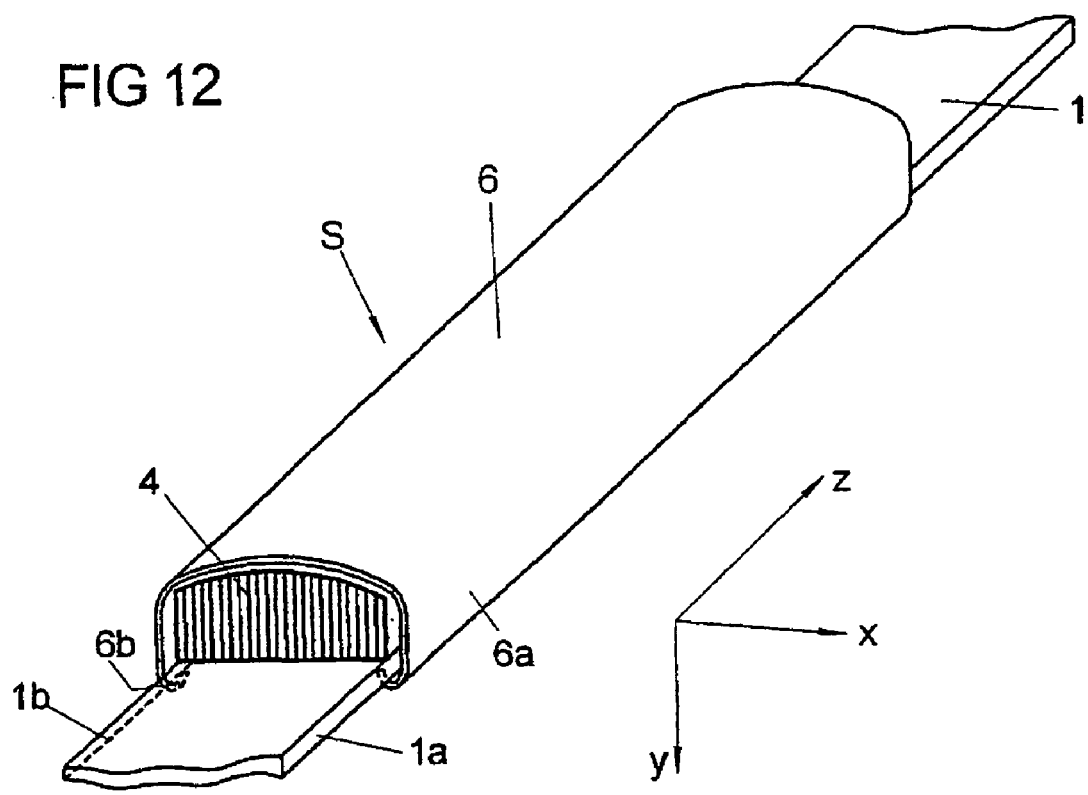
FIG. 12 is a perspective view of a frame part of a backrest frame, according to an exemplary embodiment.

FIG. 12 shows a schematic, perspective view of an airbag arrangement of the type shown in FIG. 1, according to an exemplary embodiment. A frame part 1 is shown extending along the vehicle vertical axis z. An airbag package 4 is fastened to the frame part 1, extending longitudinally along the frame part 1. The bearing region 6 of the clamping element S covers the entire outer face 5 of the airbag package 4 for pressing the airbag package 4 flat against the frame part 1. The end regions 6a, 6b of the clamping element S are respectively designed as strips of hook-shaped cross section. The end regions 6a 6b extend along the vehicle vertical axis z along the entire airbag package 4 and encompass the first and/or second edge region 1a, 1b of the frame part 1 in cross section for securing and pretensioning the bearing region 6 against the airbag package 4.

Figure 13:
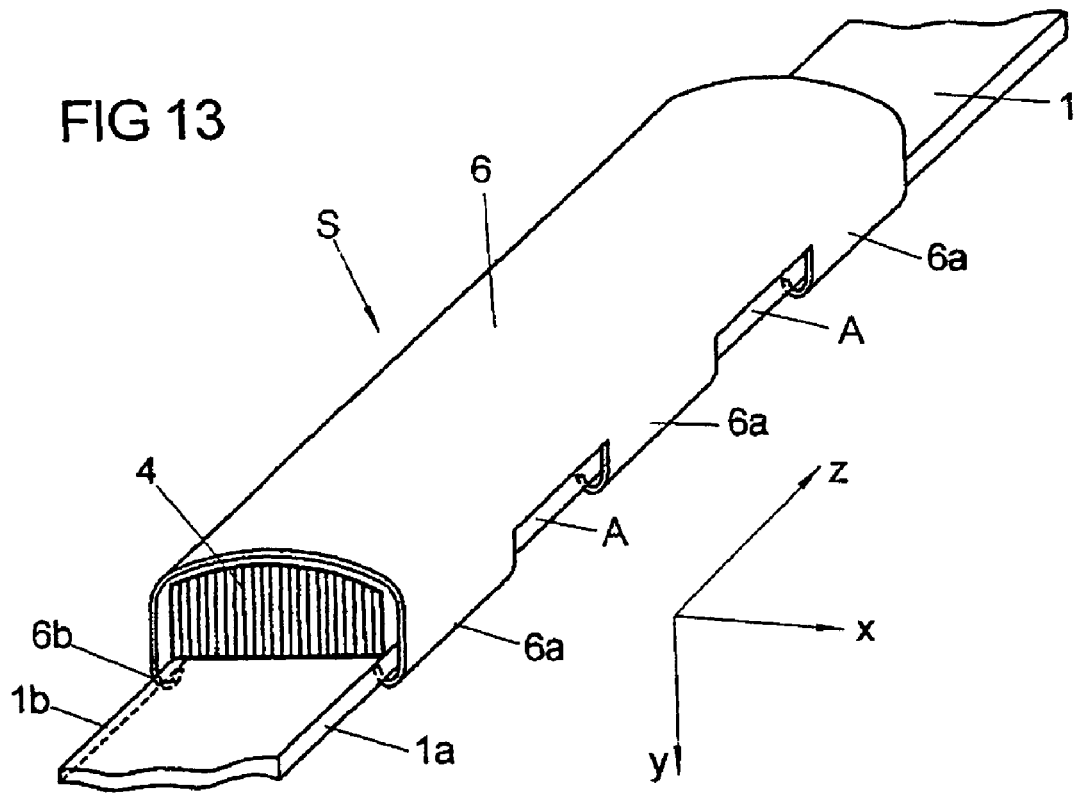
FIG. 13 is a perspective view of a modification of the clamping element shown in FIG. 12, according to an exemplary embodiment.

FIG. 13 shows a schematic perspective view of a development of the type shown in FIG. 12, according to an exemplary embodiment. In contrast to FIG. 12, the elongated strips 6a, 6b of hook-shaped cross section are not configured continuously along the vehicle vertical axis z. The elongated strips 6a, 6b form separate strip portions 6a, 6b spaced apart from one another along the vehicle vertical axis z. The strip portions 6a, 6b respectively encompass the first and/or second edge region 1a, 1b of the frame part. Further, the first and the second edge region 1a, 1b are not completely covered by the strip portions 6a, 6b along the vehicle vertical axis z, but include exposed portions A, onto which the cover 10 may be secured (hooked).

The priority application, German Patent Application No. 20 2006 008 373.1 filed May 19, 2006, including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An airbag arrangement for a motor vehicle, comprising:
a frame part, as a part of a base body of a motor vehicle seat; and
an airbag package fastened to the frame part, the airbag package including:
at least one folded-up airbag, that may be inflated with gas to protect an individual;
at least one clamping element configured to press the airbag package against the frame part,
the clamping element including a first end region and a second end region via which the clamping element is secured to the frame part, the two end regions being connected to one another via a pretensionable bearing region of the clamping element, that is pretensioned against the airbag package so that the bearing region presses the airbag package against the frame part and the clamping element including an intermediate layer extending between the airbag package and the frame part, that together with the bearing region of the clamping element encompasses the airbag package in cross section by 360°,
wherein at least one of the two end regions is configured to encompass one of the edge regions of the frame part for securing the clamping element to the frame part.

2. The airbag arrangement of claim 1, wherein the clamping element is configured to be flexible.

3. The airbag arrangement of claim 1, wherein the clamping element is configured to be rigid.

4. The airbag arrangement of claim 1, wherein the bearing region of the clamping element encompasses the airbag package in cross section by at least 180°.

5. The airbag arrangement of claim 1, wherein the airbag package includes an outer face remote from the frame part.

6. The airbag arrangement of claim 5, wherein the clamping element covers the outer face of the airbag package.

7. The airbag arrangement of claim 5, wherein the bearing region is configured for bearing against the outer face.

8. The airbag arrangement of claim 1, wherein the frame part extends longitudinally in a direction of extension.

9. The airbag arrangement of claim 8, wherein the frame part includes a first edge region and a second edge region extending in the direction of extension.

10. The airbag arrangement of claim 9, wherein the first edge region and/or the second edge region project from an inner face of the frame part remote from the airbag package.

11. The airbag arrangement of claim 1, wherein the first edge region and/or the second end region are fastened to the frame part for securing the clamping element to the frame part.

12. The airbag arrangement of claim 1, wherein the one end region is configured as an elongated strip of hook-shaped cross section, for encompassing the one edge region.

13. The airbag arrangement of claim 12, wherein the strip extends in a direction of extension along the entire airbag package.

14. The airbag arrangement of claim 12, wherein the one end region is formed by strip portions of hook-shaped cross section and spaced apart from one another in the direction of extension, for encompassing the one edge region.

15. The airbag arrangement of claim 1, wherein one of the two end regions is configured as a clip element for securing the clamping element to the frame element.

16. The airbag arrangement of claim 15, wherein the one end region is configured to engage behind a through-opening of the frame part.

17. The airbag arrangement of claim 1, wherein the frame part is a portion of a backrest frame of a backrest of the motor vehicle seat, extending along a vehicle vertical axis.

18. The airbag arrangement of claim 1, wherein the bearing region of the clamping element comprises a first openable region which is configured to open when the airbag presses against the first openable region during inflation.

19. The airbag arrangement of claim 1, further comprising a cushion at least partially surrounding the frame part and the airbag package in cross section.

20. The airbag arrangement of claim 19, wherein the cushion comprises a gap extending along the airbag package, with a first side and a second side extending along the airbag package, which oppose one another, and along which the airbag may be deployed through the gap during inflation.

21. The airbag arrangement of claim 20, further comprising a cover surrounding the cushion and a flexible first element branching off from the bearing region, which connects the bearing region to the cover, the first element covering the first side of the gap for shielding the cushion from the deployed airbag.

22. The airbag arrangement of claim 21, further comprising a flexible second element branching off from the bearing region which connects the bearing region to the cover, the second element covering the second side of the gap for shielding the cushion from the deployed airbag.

23. The airbag arrangement of claim 22, wherein the cover includes a second openable region, that is configured to open when the airbag presses against the second openable region during inflation.

24. The airbag arrangement of claim 23, wherein the first element is connected to the cover along the second openable region of the cover, and in that the second element is connected to the cover along the second openable region of the cover.

25. The airbag arrangement of claim 19, further comprising a cover surrounding the cushion.

26. The airbag arrangement of claim 19, wherein the cushion encloses the frame part in cross section.

27. The airbag arrangement of claim 26, wherein the cushion has a third openable region that is configured to open when the airbag presses against the third openable region during inflation.

28. The airbag arrangement of claim 1, further comprising a gas generator for releasing the gas required for inflating the airbag.

29. The airbag arrangement of claim 1, wherein the airbag package includes a sleeve surrounding the airbag.

30. The airbag arrangement of claim 29, wherein the sleeve surrounds a gas generator.

31. The airbag arrangement of claim 29, wherein the sleeve is integrally connected to the airbag.

32. The airbag arrangement of claim 29, wherein the sleeve has a fourth openable region that is configured to open when the airbag presses against the fourth openable region during inflation.

33. A clamping element for an airbag arrangement of a motor vehicle, comprising:
- a first end region and a second end region via which the clamping element may be secured to a frame part of a motor vehicle seat,
- the two end regions being connected to one another via a pretensionable bearing region, which is configured for bearing against an outer face remote from the frame part of an airbag package fastened to the frame part,
- the bearing region being configured to be pretensioned against the airbag package such that the bearing region presses the airbag package against the frame part, and
- wherein at least one of the two end regions is configured to encompass one of the edge regions of the frame part for securing the clamping element to the frame part.

* * * * *